(12) United States Patent
Sinclair

(10) Patent No.: US 7,316,437 B2
(45) Date of Patent: Jan. 8, 2008

(54) FUNERAL VEHICLES

(76) Inventor: Paul Sinclair, 7a Castle Street, Whitwick, Leicestershire, LE67 5AG (GB)

( * ) Notice: Subject to any disclaimer, the term of this patent is extended or adjusted under 35 U.S.C. 154(b) by 103 days.

(21) Appl. No.: 10/518,611

(22) PCT Filed: Jun. 20, 2003

(86) PCT No.: PCT/GB03/02651

§ 371 (c)(1),
(2), (4) Date: Aug. 1, 2005

(87) PCT Pub. No.: WO04/000192

PCT Pub. Date: Dec. 31, 2003

(65) Prior Publication Data

US 2006/0163896 A1  Jul. 27, 2006

(30) Foreign Application Priority Data

Jun. 21, 2002  (GB) .................. 0214418.6

(51) Int. Cl.
*B60J 7/12* (2006.01)
(52) U.S. Cl. ........................ 296/16; 280/203
(58) Field of Classification Search ............ 296/16, 296/17, 18; 280/203
See application file for complete search history.

(56) References Cited

U.S. PATENT DOCUMENTS

| | | | |
|---|---|---|---|
| 1,478,316 A * | 12/1923 | Graham | ...................... 280/203 |
| 1,741,449 A | 12/1929 | Butcher | |
| 4,079,956 A * | 3/1978 | Headington, Jr. | ............ 280/203 |
| 4,580,652 A | 4/1986 | Turner et al. | ............... 180/210 |
| 4,840,420 A * | 6/1989 | Weber | ......................... 296/116 |
| 2002/0063442 A1 | 5/2002 | Voas | .......................... 296/181 |

FOREIGN PATENT DOCUMENTS

| | | |
|---|---|---|
| DE | 33 47 095 A1 | 7/1985 |
| DE | 197 13 010 A1 | 10/1998 |
| GB | 20706 | 10/1914 |

OTHER PUBLICATIONS

Man Builds Harley-Davidson Motorcycle Hearse; Associated Press, May 2, 2002 http://www.boston.com/news/daily/02/hearse (see press release).

Paying a Final Tribute and Honorary "Last Ride" of Remembrance; Tombstone Hearse Co. at least as early as Sep. 23, 2002 http://www.tombstonehearse.com/services.html (see trailer hearse).

* cited by examiner

*Primary Examiner*—Joseph D. Pape
(74) *Attorney, Agent, or Firm*—Renner Kenner Greive Bobak Taylor & Weber

(57) ABSTRACT

A funeral vehicle (1) comprises a sidecar (2) in the form of a hearse having a chassis (4) carrying a wheel (6) and a superstructure (8) mounted on the chassis and defining a reception area (10) for a coffin (12).

17 Claims, 2 Drawing Sheets

FUNERAL VEHICLES

BACKGROUND OF INVENTION

This invention concerns improvements in or relating to funeral vehicles.

In particular it has reference to such vehicles of a kind for which the traction is provided by a motorcycle.

It is known in the art to provide a trailer for a motorcycle provided with an appropriate coffin reception area having mounting for securing the coffin in situ during transportation. It is also known to employ a sidecar chassis having a simple plate for carrying the coffin.

It is an object of the present invention to provide an improved vehicle for the transportation of a coffin or other funeral casket for the mortal remains of the deceased.

SUMMARY OF THE INVENTION

According to the invention there is provided a funeral vehicle in the form of a sidecar having a wheeled chassis provided with a sidecar superstructure defining a covered reception area for the mortal remains of the deceased and including an access door through which the mortal remains may be inserted into and removed from said area.

The sidecar superstructure affords a weatherproof vehicle intended to be attached to a motorcycle for traction. The vehicle of the invention, i.e. The motorcycle hearse or carriage, constitutes a substantive departure from the prior art in that it enables the mortal remains of the deceased, usually contained within a casket, to be easily maneuvered into and out of the funeral carriage. A deck is located within the vehicle to afford support to the casket and may be provided with the usual rollers to assist movement therealong.

The upper part of the vehicle superstructure is preferably glazed thereby to allow onlookers to view the coffin and floral tributes. The glazing may be provided with conventional toughened glass or a suitable transparent plastics material. The superstructure of the vehicle may conveniently be shaped to project a streamlined image or in the alternative may be of rectilinear box-like form in order better to accommodate the coffin shape.

The access door of the superstructure may be of hatch back design to allow shelter for the living, e.g. a pall bearer, in the event of bad weather the door being suitably hinged and advantageously having gas struts for ease of opening and maintenance of the door in the open position when desired.

The vehicle may be provided with means for cooling the reception area, namely the interior of the superstructure. Such means may be in the form of a simple cooling fan or a more complex refrigeration system. The power for such means may in the form of a battery or may be driven off the main traction unit, i.e. The motorcycle engine, when running.

The funeral vehicle may also be provided with means for illuminating the reception area powered in the same manner as the cooling means.

The vehicle of the present invention may be provided on its roof with railings, e.g. Wreath rails, in the manner of a conventional hearse in order to define a platform on which floral or other tributes to the deceased may be lain.

The vehicle may also be provided with a compartment adjacent the reception area and in particular may be disposed there beneath, a further deck being provided for support. The compartment may be designed to house other funeral accoutrements and possibly vestments to be used or worn at the ceremony. The compartment may be of sufficient magnitude to allow the stowage of for example the trestles used to support the coffin during the funeral service. Other accoutrements may be the ropes or tapes for lowering the coffin into the grave when an interment is planned. Maintenance equipment for the motorcycle may also be stowed in the compartment along with possibly personal apparel for use during and at either end of the funeral journey.

In the alternative the compartment may itself be of a size as to be able to accommodate a further casket should there be a need. The vehicle may then be considered to be double-decked.

The superstructure of the vehicle may be produced from conventional materials and provided with surface embellishments or decoration suitable for a funeral vehicle. Preferably the finish on the superstructure and the vehicle generally is of high quality to reflect the nature of the occasion for which it is intended.

The overall dimensions of the vehicle are selected dependent upon the practical requirements dictated by standard coffin sizes as far as the reception area is concerned.

BRIEF DESCRIPTION OF THE SEVERAL VIEWS OF THE DRAWINGS

By way of example only, two embodiments of a funeral vehicle according to the invention are described below with reference to the accompanying drawings in which.

DETAILED DESCRIPTION OF INVENTION

Figure 1:
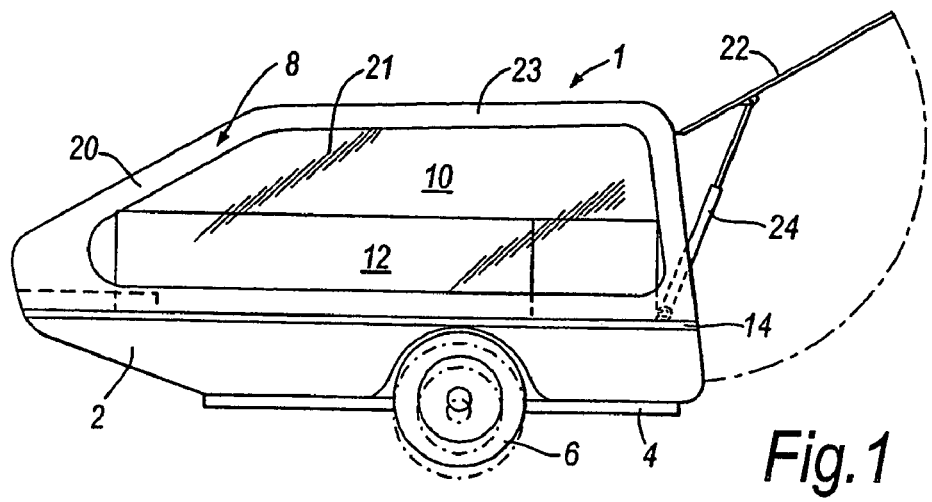
FIG. 1 is a side view of a first embodiment of the vehicle partly in sectioned outline.
Figure 2:
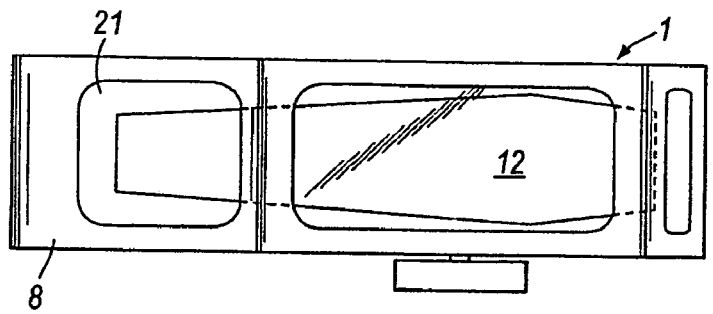
FIG. 2 is a plan view of the vehicle of FIG. 1.
Figure 3:
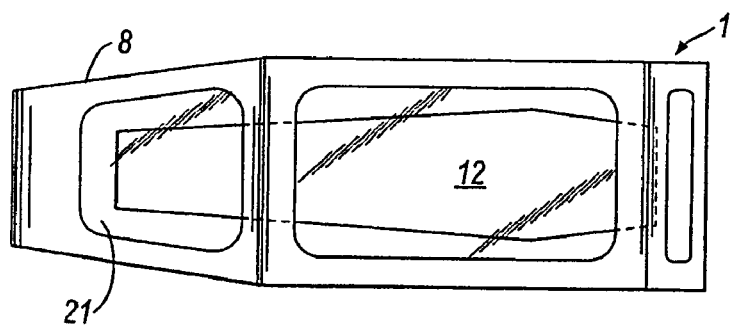
FIG. 3 is an alternative plan view of the vehicle of FIG. 1.
Figure 4:
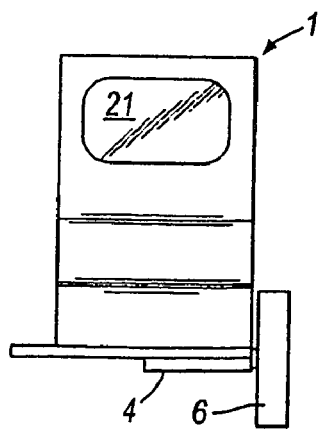
FIG. 4 is an end view of the first embodiment.
Figure 5:
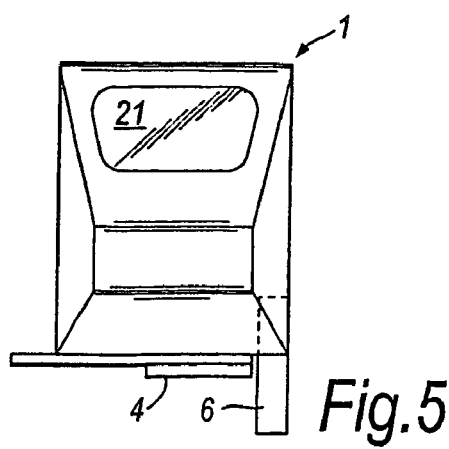
FIG. 5 is an alternative end view to that shown in FIG. 4.

Referring to FIGS. 1 to 5 a funeral vehicle is shown at 1 and comprises a sidecar 2 in the form of a hearse, the sidecar being provided with a chassis 4 carrying a wheel 6 and being adapted for connection to a motorcycle (not shown). A superstructure 8 is mounted on the chassis 4 and is provided with suspension means (not shown) and defines in its interior a reception area 10 for accommodation in use of the mortal remains of a deceased person. The remains are normally contained within a coffin or casket 12 for which the vehicle provides a supporting deck 14. The deck 14 has rollers 16 (not shown in FIGS. 1 to 5 but see FIG. 6) which assist the coffin 12 in its passage during insertion and extraction from the reception area 10. A stop (not shown) may be provided at either end of the deck 14 in order to locate the coffin 12 in a positive manner during transit, although the weight of the coffin enclosing the cadaver will usually be sufficient to ensure stability.

The superstructure 8 is enclosed and is provided with a glazed upper part 20 with transparent panels 21 in its side, end and roof 23 for the purpose of allowing mourners to view the coffin and any floral tributes during transit and upon arrival at the church, the crematorium or the place of interment. A glazed hatch back 22 is located at and hinged to the rear end of the superstructure and is so mounted as to facilitate opening and closure. To this end standard gas struts 24 are provided on each side of the vehicle, the door being provided with a suitable catch or catches (not shown) to secure the door in its closed position.

The top of the superstructure 8 may be provided externally thereof with wreath rails (not shown) for the purpose, as the appellation denotes, of constraining wreaths or other floral tributes and accordingly the sidecar vehicle of the present invention is intended to project the conventional image in use of a hearse.

As can be seen from FIGS. 2, 4 and 3, 5 the superstructure of the vehicle presents either a box shape of rectilinear form (FIGS. 2, 4) or of streamlined or tapered form (FIGS. 3, 5) at its front end, the box form being easier to manufacture for obvious reasons.

Figure 6:
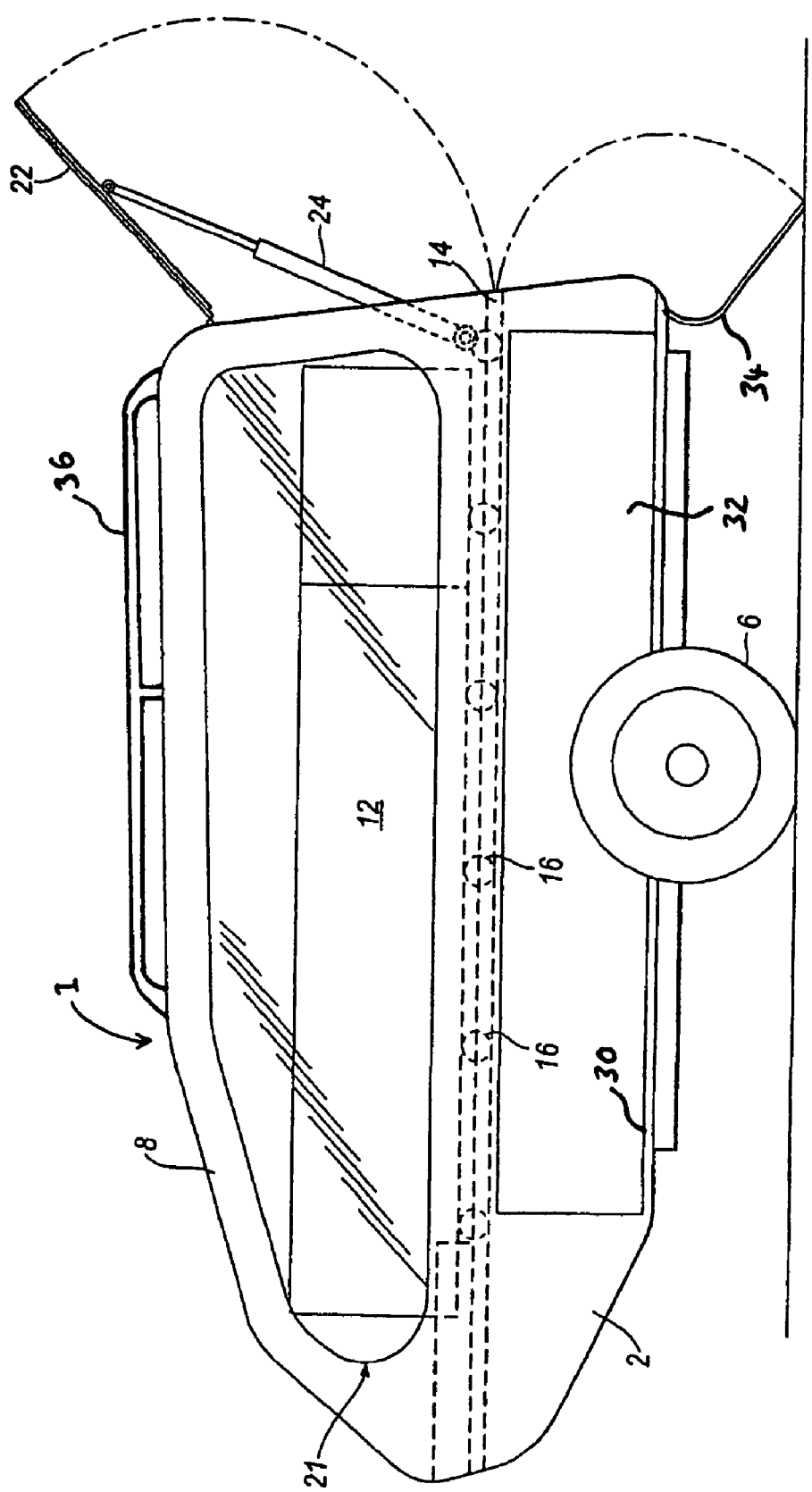
FIG. 6 is a side view of a second embodiment of the vehicle partly in sectioned outline.

Referring now to FIG. 6 there is shown a second embodiment of funeral vehicle similar to that shown in the foregoing figures save for the disposition of a further deck 30 beneath the deck 14 into which another coffin or other accoutrements or funeral paraphernalia may be stowed within the space 32 therein defined. For example the trestles on which the coffin is to stand during the funeral ceremony or otherwise together with the vestments of the pastor designated to conduct the funeral rites may also be stored therein. In the alternative or in addition other practical materials or artifacts may be stowed therein, for example tools, safety wear for the journey. The space 32 is preferably closed off at its rear part with a tailgate 34 as shown suitably hinged to the superstructure.

And as seen in FIG. 6, the vehicle 1 may be provided on its roof with railing 36, e.g. Wreath rails, in order to define a platform on which floral or other tributes to the deceased may be lain.

In use a coffin 12 is passed into the reception area 10 of the superstructure 8 for transport, the hatch back 22 being securely fastened for the journey from the undertakers to the home of the deceased and thence to the funeral service and final committee. It is envisaged that the funeral vehicle of the present invention will be attended by the pastor appointed to undertake the funeral rites and in particular the pastor may be the motorcycle rider driving the sidecar hearse.

It is further expected that the funeral vehicle of the present invention will be of particular interest to 'bikers' in terms of making their last journey in this world in association with the motorcycle that has played such a signal if not iconic part of their lives.

The funeral vehicle is constructed of materials and finished to the highest specification thereby to afford the appropriate attributes of dignity and solemnity, whilst at the same time offering to the deceased and indeed to friends and relatives the unique opportunity to be identified with the object of reverence with which the deceased had been associated so closely in this mortal world.

The invention claimed is:

1. A funeral vehicle in the form of a sidecar having a wheeled chassis provided with a sidecar superstructure defining a covered reception area for the mortal remains of the deceased and including an access door through which the mortal remains may be inserted into and removed from said area, wherein a deck with rollers is provided within the vehicle to afford support to said mortal remains.

2. A vehicle according to claim 1 in which the sidecar superstructure is weatherproof.

3. A vehicle according to claim 1 in which the relatively upper part of the superstructure is glazed.

4. A vehicle according to claim 1 in which the access door is a hatch back.

5. A vehicle according to claim 4 in which the hatchback is provided with gas struts.

6. A vehicle according to claim 1 in which cooling means for the reception area are provided.

7. A vehicle according to claim 6 in which the cooling means includes a cooling fan.

8. A vehicle according to claim 6 in which the cooling means includes a refrigeration system.

9. A vehicle according to claim 1 in which illumination means are provided for the reception area.

10. A vehicle according to claim 1 in which the top of the superstructure is provided with wreath rails.

11. A vehicle according to claim 1 in which a compartment is provided beneath the reception area.

12. A vehicle according to claim 11 in which the compartment is adapted to hold a coffin.

13. A vehicle according to claim 11 in which the compartment is adapted to contain funerary paraphernalia.

14. A vehicle according to claim 1 in which the superstructure is streamlined in shape.

15. A vehicle according to claim 1 in which the superstructure is of rectilinear form.

16. A vehicle according to claim 1 in which the wheels of the wheeled chassis are positioned on the outside of the lower part of the chassis.

17. A vehicle according to claim 1 in which the rollers are aligned with the access door.

* * * * *